(12) United States Patent
Rolin

(10) Patent No.: US 8,689,810 B2
(45) Date of Patent: Apr. 8, 2014

(54) DUST EXTRACTOR, IN THE CONTEXT OF THE TRANSFER OF POWDERY PRODUCTS, INSTALLATION, DUST EXTRACTION METHOD, TRANSFER METHOD, AND STERILIZATION METHOD USING SAID DEVICE

(75) Inventor: Francois Rolin, Saint Arnoult en Yvelines (FR)

(73) Assignee: Changexplorer Production, Braine (FR)

( * ) Notice: Subject to any disclaimer, the term of this patent is extended or adjusted under 35 U.S.C. 154(b) by 493 days.

(21) Appl. No.: 13/000,394

(22) PCT Filed: Jun. 22, 2009

(86) PCT No.: PCT/FR2009/051192
§ 371 (c)(1),
(2), (4) Date: Dec. 21, 2010

(87) PCT Pub. No.: WO2010/007288
PCT Pub. Date: Jan. 21, 2010

(65) Prior Publication Data
US 2011/0100397 A1 May 5, 2011

(30) Foreign Application Priority Data

Jun. 23, 2008 (FR) ...................................... 08 54131

(51) Int. Cl.
*B08B 3/00* (2006.01)
(52) U.S. Cl.
USPC ............... 134/60; 134/104.2; 15/345; 15/406

(58) Field of Classification Search
None
See application file for complete search history.

(56) References Cited

U.S. PATENT DOCUMENTS

2006/0207055 A1* 9/2006 Ivarsson et al. ................. 15/353

FOREIGN PATENT DOCUMENTS

| DE | 1893075 | 5/1964 |
|---|---|---|
| EP | 1561521 A2 | 8/2005 |
| FR | 2770426 | 5/1999 |
| FR | 2779668 | 12/1999 |
| GB | 1286727 | 8/1972 |
| WO | WO 2005/056443 A1 | 6/2005 |

\* cited by examiner

*Primary Examiner* — Eric Golightly
(74) *Attorney, Agent, or Firm* — Hamre, Schumann, Mueller & Larson, P.C.

(57) ABSTRACT

A device installation and methods for extracting dust during the transfer of pulverulent products from a first container to a second container, the combination of the first container and of the second container forming, with the dust extraction device, a closed containment volume with connection between the two containers. A hollow connector with a side wall between its two ends defines an external wall and an internal wall so that the connector is pierced with several inlet pipes connected to hoses fed with a stream of pressurized fluid and also pierced with at least one fluid discharge pipe. The pipes projecting from said external wall of the connectors and opening onto the internal wall via orifices allows fluid to be introduced, the orifices being oriented relative to one another in such a way as to cause the fluid to flow in a cyclone within the connector, carrying with it any pulverulent product that remains on the internal wall and/or upstream and/or downstream of said connector.

27 Claims, 5 Drawing Sheets

DUST EXTRACTOR, IN THE CONTEXT OF THE TRANSFER OF POWDERY PRODUCTS, INSTALLATION, DUST EXTRACTION METHOD, TRANSFER METHOD, AND STERILIZATION METHOD USING SAID DEVICE

The present invention relates essentially to a device for the extraction of dust in the context of the transfer of pulverulent products, to an installation comprising said device, and to a method for extracting dust, a method for transferring at least one pulverulent product, and a method of sterilizing using said device.

PRIOR ART

It is known that the transfer of products of a very sticky nature, such as pulverulent products, using means such as containers, pipes or the like, involves the need regularly to clean the internal walls of these transfer means, because of deposits and other buildup likely to form there.

Customarily, this type of problem entails dismantling one by one the various elements used during the transfer so that these can be cleaned by a conventional method. However, this technique does have disadvantages, particularly when the product transferred requires containment, given that manual cleaning does not readily allow these containment conditions to be met, unless cumbersome, expensive special-purpose equipment is set in place which also lengthens the time taken to perform the cleaning operation.

There are very few cleaning systems applied to containers notably of pulverulent products and which are able in particular to operate in a containment environment proposed in the prior art. Mention may notably be made of French patent 2 770 426, which proposes a device and a method for cleaning the walls of a cavity, which consists in placing in the cavity at least one elongate flexible nozzle, which is immobilized at one end on the wall of the cavity and free to move at the other end, and which is fed with a pressurized fluid and thus moves around at random inside the cavity at its end that is free to move, spraying a jet of fluid onto the walls of the cavity, allowing the surface cleaning of said walls.

However, with this device, there still remains the need for the flexible nozzle that was introduced into the cavity to be cleaned afterwards, notably around its base that was immobilized on the wall of said cavity, which is a site at which deposits of material are most likely to occur and which breaches the containment if the nozzles are removed during transfer.

Also known, from document GB 1 286 727, is a device for fluidizing pulverulent solid materials from a hopper so as to break up clumps, this entailing sending pressurized air toward the single outlet situated at the base of the hopper.

That device is unable to solve the technical problems addressed by the invention and as defined hereinafter. Further, the structure described in that document differs from the device of the invention as defined by the claims and which notably comprises a specific lateral discharge pipe for the fluid, something which is indispensable in as far as the dust extraction device according to the invention is a device for transfer between two containments which are therefore fluidtight, something which is rendered necessary by the transfer of pharmaceutical, cosmetic or agrifoodstuffs products where any contamination of the product from the environment or with any traces of products transferred earlier via the same device has to be avoided.

Finally, document EP 1 561 521 relates to a device for preventing the buildup of undesirable products by cleaning using a fluid appropriate to these products, said fluid being sprayed in a continuous jet through an annular element (935) provided only with fluid inlet orifices. That device makes no provision for discharging fluid in the side wall, something which is indispensable in the context of the extraction of dust from a closed cavity.

PURPOSES OF THE INVENTION

A main purpose of the present invention is therefore to provide a new device for the extraction of dust, particularly in the context of transfers of pulverulent products, that allows the internal wall of said device and the parts upstream and downstream thereof to be cleaned, which is able to operate while at the same time complying with strict containment requirements, notably in the context of use of the transferred pulverulent product in the formulation of pharmaceutical, cosmetic or agrifoodstuff products, so as to avoid any contamination of product by the environment or by traces of products transferred earlier using the same device.

Another purpose of the present invention is to solve the set technical problem in a way that is particularly simple, at sufficiently low cost by comparison with the solutions of the prior art, allowing the provision of a device that can be a single-use device, this solution being dependably and reliably usable on an industrial and pharmaceutical scale.

Another object of the present invention is to provide an installation incorporating said device, and, on the one hand, a method of extracting dust using said device, on the other hand, a method of transferring pulverulent products comprising said device by way of means of connection between two containers, and finally a method of sterilizing that applies to said device or to said installation.

SUMMARY OF THE INVENTION

A first subject of the present invention relates to a device for extracting dust, in particular in the context of the transfer of pulverulent products from a first container to a second container, the combination of the first container and of the second container forming, with the dust extraction device, a closed containment volume comprising, by way of means of connection between the two containers, a hollow connector having an open top end and an open bottom end, comprising a side wall between its two ends, said side wall defining an external wall and an internal wall, characterized in that said connector is pierced with several fluid inlet pipes connected to hoses fed with a stream of pressurized fluid and also pierced with at least one fluid discharge pipe, said inlet and discharge pipes projecting from said external wall of said connector, and opening onto said internal wall via orifices that allow the fluid to be introduced, said orifices being oriented relative to one another in such a way as to cause said fluid to flow in a cyclone within said connector, carrying with it any pulverulent product that remains on the internal wall and/or upstream and/or downstream of said connector.

Said device can be used particularly after a transfer operation, that is to say after a container has been completely emptied into another container, so as to eliminate any trace of the product that has just been transferred, and thus prevent any contamination of a product with another product transferred earlier using the same device.

According to a preferred embodiment, the hollow connector is connected to a flexible and crushable first hollow sleeve tube forming the connection between the first container and the open top end, and to a flexible and crushable second hollow sleeve tube forming the connection between the second container and the open bottom end, so as to allow closed containment of a small volume by crushing the first sleeve tube and the second sleeve tube during cleaning or dust removal operations.

According to one particularly advantageous alternative form, some of said inlet pipes open onto the internal wall of said connector at an orientation that is tangential to said wall.

According to one embodiment, some of said tangentially oriented fluid inlet pipes are, independently or in combination, oriented:
- upward at an angle $\theta_1$ comprised strictly between 0° and 90° with respect to the plane of said connector, defined for example by the plane of the open top end, the limit values $\theta_1=0°$ and $\theta_1=90°$ being excluded;
- downward at an angle $\theta_1$ strictly comprised between 0° and 90° with respect to the plane of said connector, the limit values $\theta_1=0°$ and $\theta_1=90°$ being excluded.

According to another embodiment some of said tangentially oriented fluid inlet pipes are, independently or in combination, oriented:
- upward at an angle $\theta_1$ comprised between 20° and 60° with respect to the plane of said connector, defined for example by the plane of the open top end;
- downward at an angle $\theta_1$ comprised between 20° and 60° with respect to the plane of said connector.

According to yet another embodiment, some of said tangentially oriented fluid inlet pipes are, independently or in combination, oriented:
- upward at an angle $\theta_2$ comprised between 0° and 90° on each side of the plane of section defined by the axis of revolution of said connector and the axis parallel to said axis of revolution and passing through the edge of the orifice of the pipe in question;
- downward at an angle $\theta_2$ comprised between 0° and 90° on each side of the plane of section defined by the axis of revolution of said connector and the axis parallel to said axis of revolution and passing through the edge of the orifice of the pipe in question.

Finally, according to another embodiment, some of said tangentially oriented fluid inlet pipes are oriented substantially in the plane of said connector, i.e. at an angle $\theta_1=0°$ and an angle $\theta_2=90°$ on one side or other of the plane of section defined by the axis of revolution of said connector and the axis parallel to said axis of revolution and passing through the edge of the orifice of the pipe in question.

It is considered that the above-defined embodiments can be considered independently or in combination with one another. Specifically, said pipes may be arranged in relation to one another in all possible ways, provided that said pipes are clearly aimed at the walls that need to have their dust removed.

In a preferred and particularly advantageous manner, said fluid inlet pipes are arranged around said connector antisymmetrically with respect to the axis of revolution of said connector, to make it possible to obtain an optimum cyclonic flow dynamics and thus allow optimal extraction of dust from the targeted walls.

According to the invention, said fluid may be any liquid or gas that can be used for cleaning away any traces of pulverulent product remaining on the walls of said device either by simple mechanical dust removal or alternatively by dissolving them.

According to the invention, said stream of pressurized fluid fed to said fluid inlet pipes may be a stream of fluid at high pressure, preferably at a pressure in excess of 300 kPa.

In particular, according to the invention, said stream of fluid is supplied to said fluid inlet pipes by means of a pump or of a compressor situated upstream of said connector.

According to one particular alternative form, said at least one fluid discharge pipe is oriented substantially in or parallel to the plane formed by said connector.

According to the invention, said fluid discharge pipe may be situated at any point on the surface formed by the side wall of said connector, and as a particular preference, said discharge pipe is situated at some point on the circumference that lies at mid-height of said connector, this favored position allowing a better distribution of the fluid and thus optimal removal of dust from the walls situated upstream and downstream of said connector.

According to the invention, in particular, said connector may have a substantially cylindrical internal wall.

According to an alternative form of embodiment, said connector is equipped with a closure system in its top and/or bottom end(s), allowing the fluidtight connection between two containers.

According to one particular embodiment, said closure system is the welding of said connector at its top or bottom end to said container or situated upstream of said connector, thus making it possible to provide a complete assembly comprising a container and a connector welded to it, ready for use.

According to another particular embodiment, said closure system is a mechanical closure means such as an external clamping means, for example a ring, a serflex or alternatively a clamp, said system being rendered fluidtight by the addition of a seal positioned between the surface formed by one of said ends of said connector and the surface formed by the end of the opening of said container.

According to the invention, said container may be any reactor or drum likely to contain at least one pulverulent product.

In particular, said container may be a sleeve tube or a pouch made of plastic.

According to the invention, in particular, said connector may be made of plastic, preferably of polyethylene or polypropylene. Said connector thus, in one particularly preferred embodiment, is of a disposable nature.

According to an alternative form of embodiment, said connector may be manufactured in full or in part using molding.

According to one particular alternative form of embodiment, said connector may consist of a sleeve to which said fluid inlet and discharge pipes are grafted, notably by welding and/or piercing of said connector.

Thus, said connector may advantageously easily be adapted to any diameter, to suit the respective diameters of the ends of the containers which are connected to it.

A second subject of the present invention relates to an installation comprising the device as defined hereinabove, characterized in that said fluid inlet pipes are fed by means of a pump or a compressor and in that said at least one fluid discharge pipe may be connected to a hose connected to a suction system or left open to the external environment or, alternatively, connected to the final container, so as, for example, to allow the remainder of the transferred product to be recovered.

According to one particular alternative form of embodiment, said installation may further comprise, downstream of said pump or of said compressor, a system of two turbines connected by a shaft, the first turbine being driven by the fluid stream that feeds said fluid inlet pipes, and the second turbine making it possible to create a vacuum to discharge said fluid via said at least one fluid discharge pipe.

According to the invention, said two-turbine system may be made of plastic, preferably of polyethylene or polypropylene.

According to the invention, in particular, said at least one fluid discharge pipe may further be connected to a dust filter upstream of where the fluids are discharged into the atmosphere.

Thus, according to the invention, said installation may make it possible to recover the powder initially remaining on the various walls of said device, something which is of particular benefit if the product is expensive or alternatively is harmful to the environment.

In particular, according to the invention, the dimensions of said connector and of said fluid inlet and discharge pipes are related to one another and proportional to the size of the installation comprising said device. According to one particular embodiment, for a device in which said connector is of a diameter of 100 mm, said fluid inlet pipes are of a diameter of 8 to 15 mm, and said at least one fluid discharge pipe is of a diameter of 15 to 25 mm.

A third subject of the present invention relates to a method for extracting dust in the context of the transfer of pulverulent products from a first container to a second container, characterized in that it comprises the following steps:

a) providing a device as defined hereinabove;

b) connecting said device upstream and downstream to the initial and final containers for said pulverulent product;

c) feeding said fluid inlet pipes with a stream of pressurized fluid in order to cause said fluid to flow in a cyclone within said connector, carrying with it any pulverulent product that remains on the internal wall and/or upstream and/or downstream of said connector;

d) discharging said fluid and said pulverulent product via at least one fluid discharge pipe.

In particular, according to the invention, step b) may be performed by connecting said device to sleeve tubes fixed respectively to the initial and final containers, and by closing the opening of said containers using external clamping means, for example of the clamp type, thus closing the sleeve tubes by squeezing them together. The entire device equipped with the sleeve tubes thus defines an enclosed containment space.

According to the invention, the method of removing dust is performed under a stream of fluid under pressure fed to said fluid inlet pipes of said device and which stream may be a stream of fluid under high pressure, particularly under a pressure in excess of 100 kPa, preferably under a pressure in excess of 300 kPa.

According to one particular embodiment, said discharge step may furthermore advantageously comprise a suction system connected to said at least one fluid discharge pipe by a hose.

According to another particular embodiment, said discharge step may further comprise a dust filter upstream of where the fluids are discharged into the atmosphere and connected to said at least one fluid discharge pipe by a hose.

A fourth subject of the present invention relates to a method of transferring at least one pulverulent product, characterized in that it comprises the following steps:

a) providing a device as defined hereinabove;

b) supplying the initial container with said at least one pulverulent product that is to be transferred;

c) connecting said device upstream to said initial container;

d) connecting said device downstream to the final container intended to receive said at least one pulverulent product that has been transferred;

e) transferring said at least one pulverulent product from said initial container to said final container.

In particular, according to the invention, steps c) and d) are performed by connecting said device to sleeve tubes fixed respectively to the initial and final containers.

According to a first alternative form of embodiment, said intended device, comprising said fluid inlet pipes and said at least one fluid discharge pipe, has no fluid fed to said pipes, during the transfer of said at least one pulverulent product.

According to a second alternative form of embodiment, said method further comprises a step of feeding fluid to said fluid inlet pipes of said device with a stream of pressurized fluid, said at least one discharge pipe preferably remaining closed throughout the dust removal operation.

According to the invention, said stream of pressurized fluid fed to said fluid inlet pipes oriented substantially in the plane of said connector may be a stream of fluid under low pressure, preferably under a pressure of between 10 kPa and 100 kPa, making it possible to create an annulus of said fluid within said connector while said at least one pulverulent product is being transferred.

According to the invention, said final container intended to receive said at least one pulverulent product that has been transferred may be made of a material that is permeable to the fluid fed to said pipes directed substantially in the plane of said connector, and impermeable to said at least one pulverulent product transferred, these properties resulting either from the material of which said final container is made or from micropores of suitable diameters.

Furthermore, advantageously, said method may further comprise a step that uses the method of removing dust from said device as defined hereinabove.

Thus, during dust removal, the two sleeve tubes are closed by a clamp system making it possible to delimit a fluidtight cavity around the device. While the powder is being transferred, the clamps are then removed, leaving the powder free to pass.

A final subject of the present invention relates to a method of sterilizing using a device or an installation as defined hereinabove, characterized in that it involves feeding said fluid inlet pipes of said device with a pressurized stream of a fluid so that the entirety of said device or said installation can be sterilized by passing said fluid through said device or said installation.

In particular, according to this last subject of the invention, said sterilizing fluid may be a flowable vapor, a gas or alternatively peracetic acid.

All the subjects of the present invention apply to any pulverulent product that can be used particularly in the context of the manufacture of pharmaceutical, cosmetic or agrifoodstuff products.

Further purposes, features and advantages will become clearly apparent to those skilled in the art through the following description, given with reference to a currently preferred embodiment of the invention provided solely by way of illustration and which does not therefore in any way restrict the scope of the invention. For example, the temperature is given in degrees Celsius or alternatively is ambient temperature, the pressure is atmospheric pressure and the dimensions are given in millimeters (mm), unless otherwise indicated.

DETAILED DESCRIPTION

Figure 1:
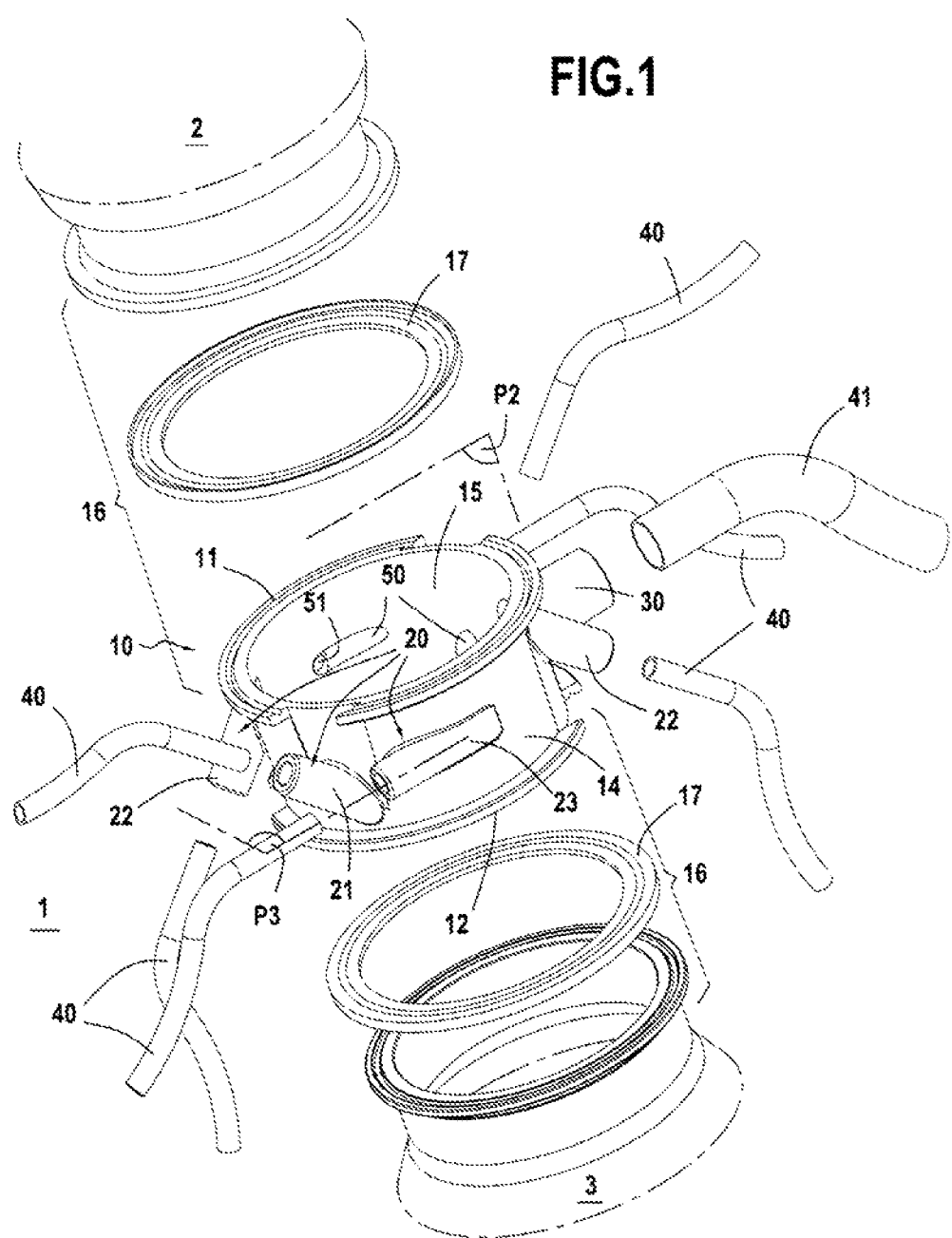
FIG. 1 is an exploded general view of one of the preferred embodiments of the device (1) according to the present invention, including a depiction of said connector (10) provided with several of said inlet pipes (20), and with a discharge pipe (30), said pipes (20) being connected to hoses (40), (41), said connector (10) also being provided at its top (11) and bottom (12) ends with a closure system (16) fitted with a seal (17), allowing connection to the upper (2) and lower (3) containers.
Figure 2:
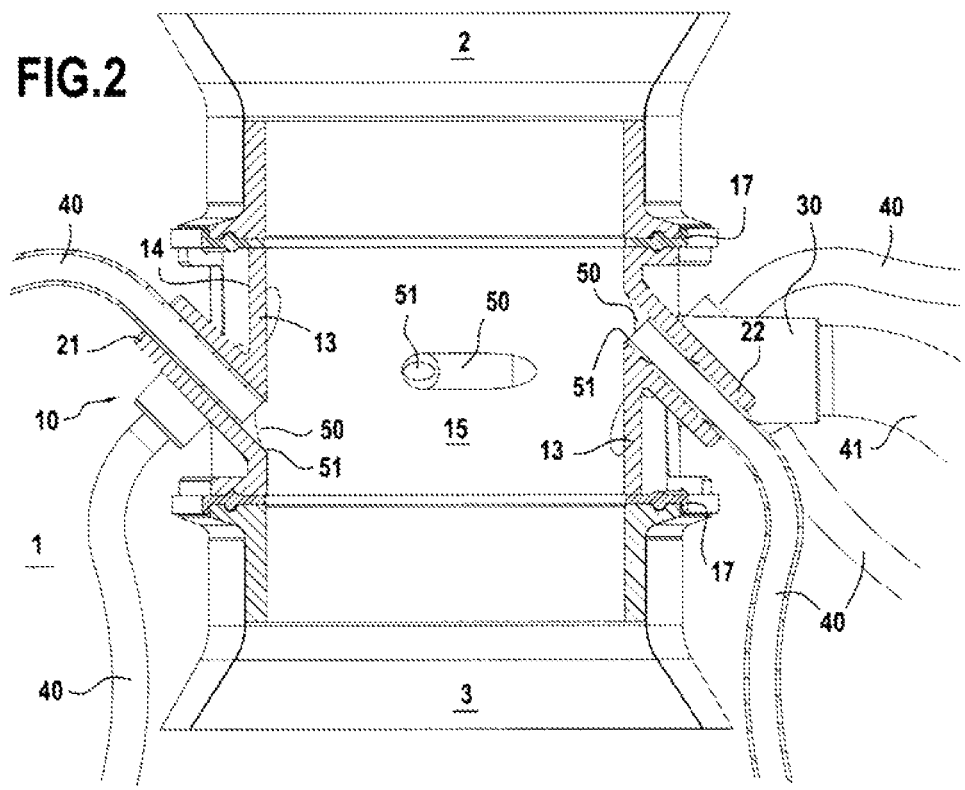
FIG. 2 is a side view of the same preferred embodiment of said device (1), on the plane of section $P_2$ depicted in FIG. 1.
Figure 3:
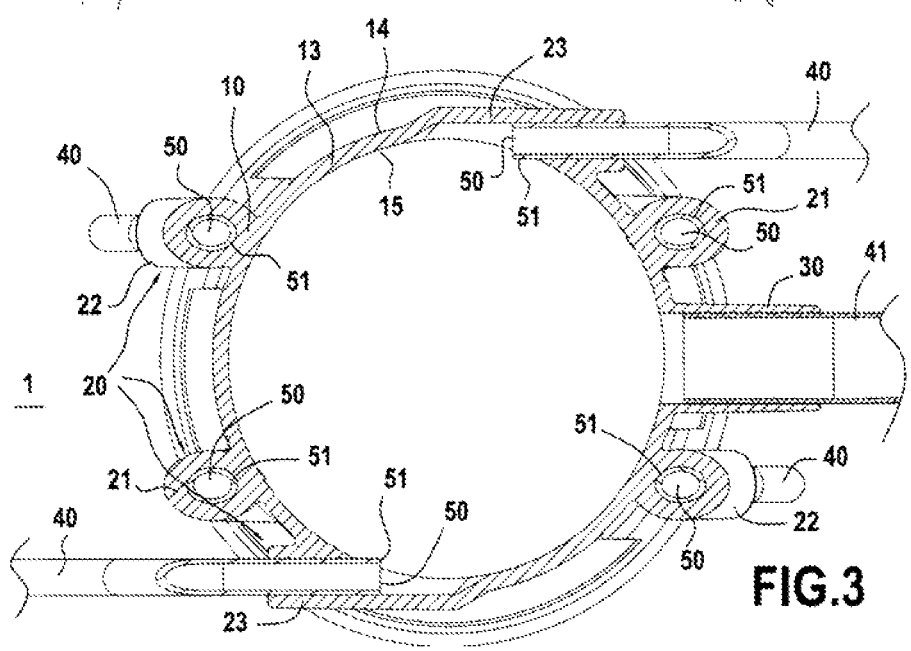
FIG. 3 is a top view of the same preferred embodiment of said device (1), on the plane of section $P_3$ depicted in FIG. 1.
Figure 4:
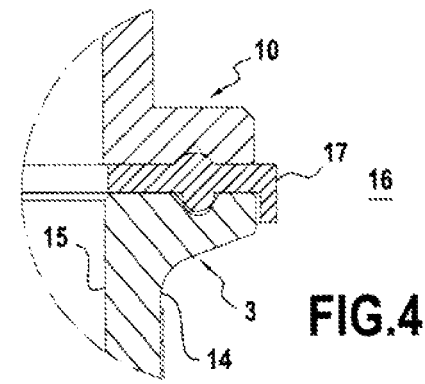
FIG. 4 is a detail of the closure system (16) according to the same preferred embodiment of said device.

With reference to the attached FIGS. 1 to 8, and in particular to FIG. 1, one of the currently preferred embodiments of the invention comprises a dust extraction device depicted under the general reference number (1), in the context of the transfer of pulverulent products from one container to another and comprising, by way of means of connection between a first container (2) and a second container (3), a hollow connector (10) having an open top end (11) and an open bottom end (12), comprising a side wall (13) between its two ends, said side wall (13) defining an external wall (14) and an internal wall (15).

This device is characterized in that said connector (10) is pierced with several fluid inlet pipes (20) connected to hoses (40) fed with a stream of pressurized fluid and also pierced with at least one fluid discharge pipe (30), said inlet (20) and discharge (30) pipes projecting from said external wall (14) of said connector (10), and opening onto said internal wall (15) via orifices (50) that allow the fluid to be introduced, said orifices (50) being oriented relative to one another in such a way as to cause said fluid to flow in a cyclone within said connector (10), carrying with it any pulverulent product that remains on the internal wall (15) and/or upstream and/or downstream of said connector (10).

According to a particularly advantageous alternative form of embodiment, some of said inlet pipes (20) open onto the internal wall (15) of said connector (10) at an orientation that is tangential to said wall.

According to the currently preferred embodiment of the invention depicted in FIGS. 1 to 6, said device comprises six of said fluid inlet pipes (20) oriented tangentially with respect to said side wall (13) as follows:

two of said inlet pipes (20) are oriented upward, and depicted under the reference (22) in the attached FIG. 1, at an angle θhd 1 comprised substantially between 20° and 60° with respect to the plane of said connector (10), defined for example by the plane of the open top end (11);

two of said inlet pipes (20) are oriented downward and depicted under the reference (21) in the attached FIG. 1, at an angle $\theta_1$ comprised substantially between 20° and 60° with respect to the plane of said connector (10);

two of said inlet pipes (20) are oriented substantially in the plane of said connector (10), and depicted under the reference (23) in the attached FIG. 1, namely at an angle $\theta_1=0°$ and an angle $\theta_2=90°$ on one or other side of the plane of section defined by the axis of revolution of said connector (10) and the axis parallel to said axis of revolution passing through the edge (51) of the orifice (50) of the pipe in question.

In particular, according to this embodiment of the invention, said fluid inlet pipes (20) oriented tangentially upward or downward may be oriented at an angle $\theta_2$ comprised between 0° and 90° on each side of the plane of section defined by the axis of revolution of said connector (10) and the axis parallel to said axis of revolution and passing through the edge (51) of the orifice (50) of the pipe in question.

In a preferred and particularly advantageous manner, said fluid inlet pipes (20) are arranged around said connector (10) antisymmetrically with respect to the axis of revolution of said connector (10), to make it possible to obtain optimum cyclonic flow dynamics and thus permit optimal removal of dust from the targeted walls.

According to the invention, said fluid may be any liquid or gas that allows any pulverulent product remaining on the walls of said device to be cleaned off through simple mechanical dust removal or alternatively by dissolving it.

According to the invention, said stream of pressurized fluid fed to said fluid inlet pipes (20) may be a stream of fluid under high pressure, preferably under a pressure in excess of 300 kPa.

In particular, according to the invention, said stream of fluid may be supplied to said fluid inlet pipes (20) by means of a pump (110) or of a compressor situated upstream of said connector (10).

According to the preferred embodiment of the invention depicted in FIGS. 1 to 8, said device comprises a fluid discharge pipe (30) which is directed substantially in or parallel to the plane formed by said connector (10) and situated at a point on the circumference situated mid-height of said connector (10), this favored position allowing a better distribution of the fluid and thus optimal removal of dust from the walls situated upstream and downstream of said connector (10).

Advantageously, said connector (10) may have a substantially cylindrical internal wall (15).

According to a currently preferred alternative form of embodiment, said connector (10) is equipped with a closure system (16) in its top (11) and/or bottom (12) end(s), allowing the fluidtight connection between two containers (2), (3).

According to a currently preferred embodiment, said closure system (16) is a mechanical closure means, said system being rendered fluidtight by the addition of a seal (17) positioned between the surface formed by one of said ends (11) and (12) of said connector (10) and the surface formed by the end of the opening of said containers (2) and (3).

According to the invention, said container (2) or (3) may be any reactor or drum likely to contain at least one pulverulent product.

In particular, said container (2) or (3) may be a sleeve tube or a pouch made of plastic.

According to the invention, in particular, said connector (10) may be made of a plastic, preferably of polyethylene or polypropylene.

According to one alternative form of embodiment, said connector (10) may be produced in full or in part using molding.

According to one particular alternative form of embodiment, said connector (10) may consist of a flexible sleeve to which said fluid inlet (10) and discharge (30) pipes are grafted, notably by welding and/or piercing of said connector (10).

Thus, said connector (10) may advantageously be suited easily to any diameter, according to the respective diameters of the ends of the containers (2), (3) connected to it.

According to the second subject thereof, and in particular with reference to the attached FIGS. 5 and 6, the present invention also covers an installation (100) comprising the device as defined hereinabove, characterized in that said fluid inlet pipes (20) are fed by means of a pump (100) or of a compressor and in that said fluid discharge pipe (30) is connected to a hose (41) left open to the external environment.

Advantageously, said installation may further comprise a suction system which is connected to said discharge pipe (30) by the hose (41).

Figure 6:
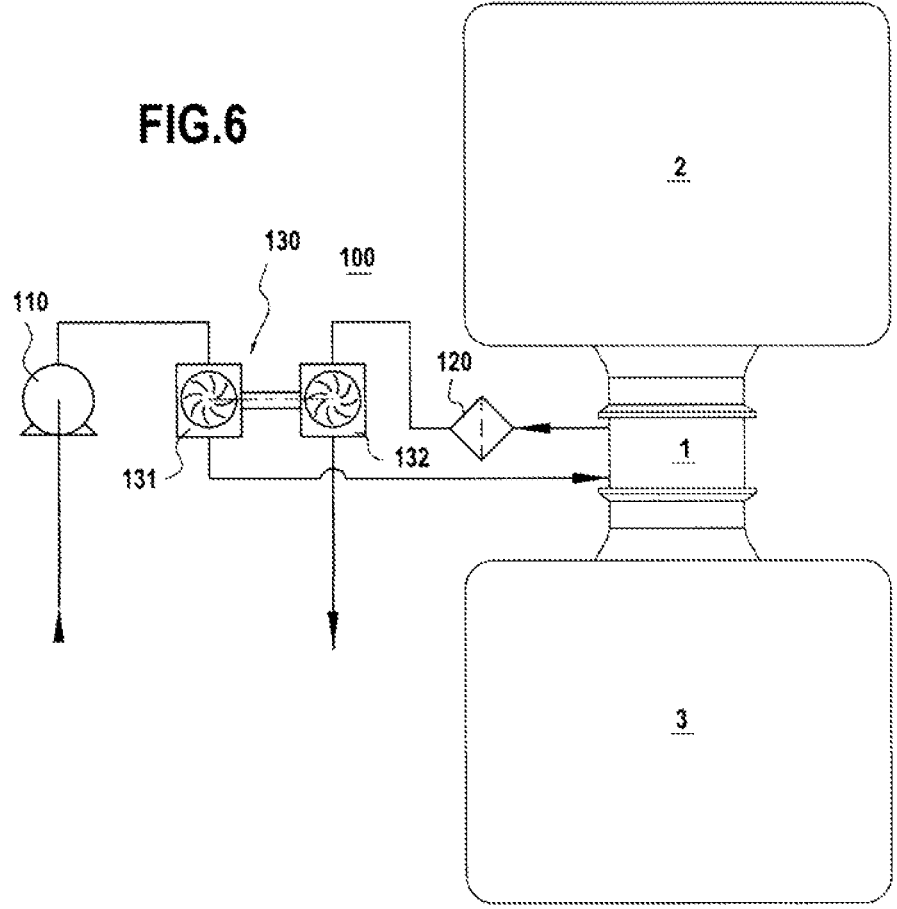
FIG. 6 is a schematic depiction of a preferred alternative form of embodiment of the installation (100) comprising the device (1) according to the invention, further comprising, downstream of said pump (110) or of said compressor, a system of two turbines (130) connected by a shaft, for both supplying said device (1) with fluid via its connection downstream of the first turbine (131), said first turbine (131) being driven by said feed stream of fluid from said pump (110) or from said compressor, and discharging said fluid via its connection upstream of the second turbine (132), said second turbine (132) creating a vacuum.

According to a currently preferred particular alternative form of embodiment depicted in the attached FIG. 6, said installation may further comprise, downstream of said pump (100) or of said compressor, a system of two turbines (130) connected by a shaft, the first turbine (131) being driven by the fluid stream that feeds said fluid inlet pipes (20), and the second turbine (132) making it possible to create a vacuum to discharge said fluid via said at least one fluid discharge pipe (30).

According to the invention, said system of two turbines may be made of a plastic, preferably of polyethylene or polypropylene.

Figure 5:
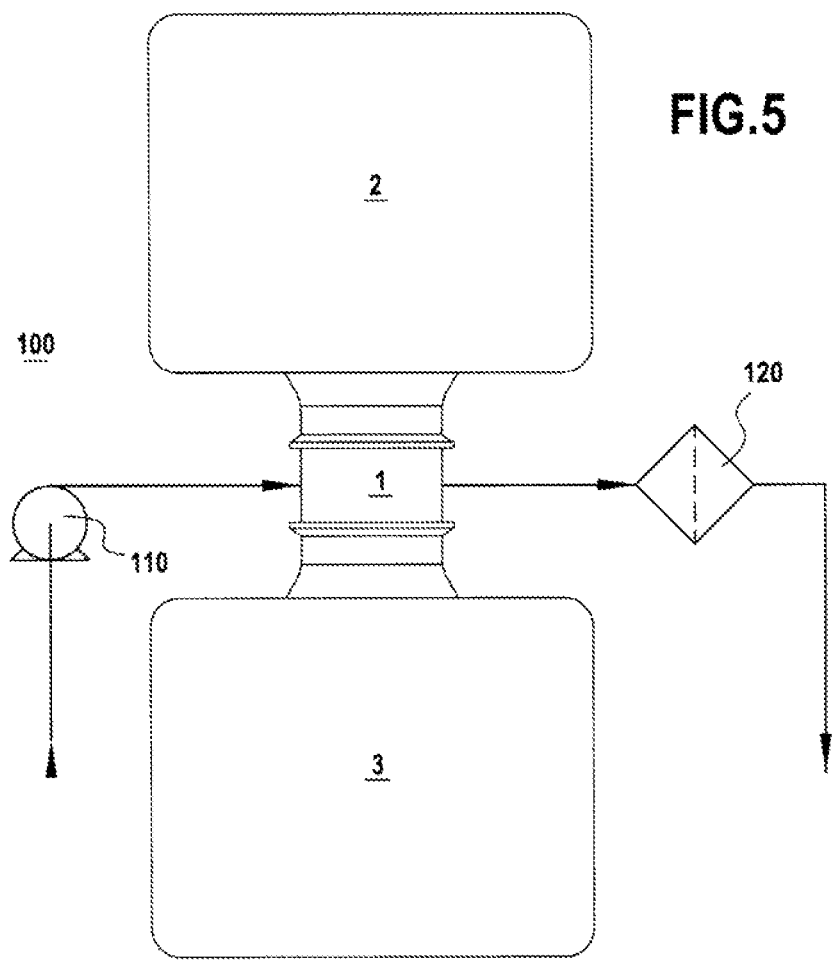
FIG. 5 is a schematic depiction of one of the preferred embodiments of the installation (100) comprising the device (1) according to the invention, comprising said device (1) connected, via a closure system (16) at its top (11) and bottom (12) ends, to an upper container (2) and a lower container (3), said device (1) also being supplied with fluid via a pump (110) and equipped with a discharge system and with a dust filter (120) allowing said purified fluid to be discharged.

According to the invention, as a preference, and as depicted in the attached FIGS. 5 and 6, said discharge pipe (30) is further connected to a dust filter (120) upstream of where the fluids are discharged into the atmosphere.

According to the currently preferred embodiment of the device depicted, said connector is of a diameter of 100 mm, said fluid inlet pipes are of a diameter of 8 to 15 mm, and said fluid discharge pipe is of a diameter of 15 to 25 mm.

According to the third subject thereof, and in particular with reference to the attached FIGS. 5 to 8, the present invention also covers a method for extracting dust in the context of the transfer of pulverulent products from a first container (2) to a second container (3), characterized in that it comprises the following steps:

a) providing a device (1) as defined hereinabove;
   b) connecting said device (1) upstream and downstream to the initial (2) and final (3) containers for said pulverulent product;
   c) feeding said fluid inlet pipes (20) with a stream of pressurized fluid in order to cause said fluid to flow in a cyclone within said connector (10), carrying with it any pulverulent product that remains on the internal wall (15) and/or upstream and/or downstream of said connector (10);
   d) discharging said fluid and said pulverulent product via at least one fluid discharge pipe (30).

Figure 7:
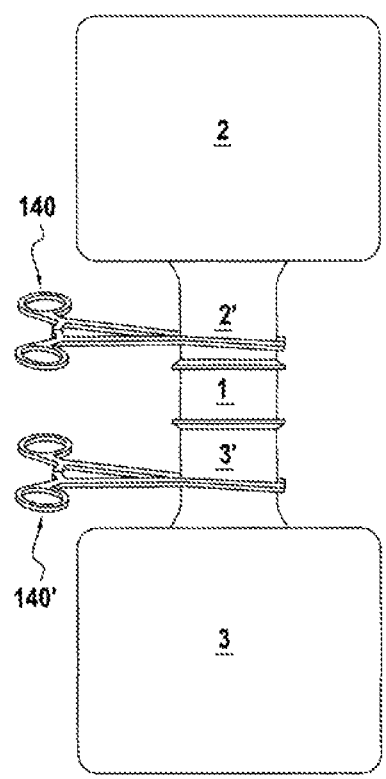
FIG. 7 depicts a preferred embodiment of the installation (100) comprising the device (1) according to the invention during its operation in the method of dust removal according to the invention: said device (1) is then connected to flexible sleeve tubes (2') and (3') respectively fixed to the initial (2) and final (3) containers, and two clamps (140) and (140') are closed onto said sleeve tubes, upstream and downstream of the connector, thus defining an enclosed containment space.

According to the invention, as a preference and as depicted in the attached FIG. 7, step b) is performed by connecting said device (1) to sleeve tubes (2') and (3') fixed respectively to the initial (2) and final (3) containers, and by closing the opening of said containers using external clamping means (140) and (140'), of the clamp type, thus closing the sleeve tubes (2') and (3') by squeezing them together. The entire device (1) equipped with the sleeve tubes (2') and (3') defines an enclosed containment space.

According to the invention, the method of removing dust is performed under a stream of pressurized fluid fed to said fluid inlet pipes (20) of said device which may be a stream of fluid under high pressure, particularly under a pressure in excess of 100 kPa, preferably under a pressure in excess of 300 kPa.

Advantageously, said discharge step may comprise a suction system connected to said discharge pipe (30) by a hose (41).

According to a currently preferred particular embodiment, said discharge step may further comprise a dust filter (120) upstream of where the fluids are discharged into the atmosphere and connected to said fluid discharge pipe (30) by the hose (41).

According to the fourth subject thereof and in particular with reference to the attached FIGS. 5 to 8, the present invention also covers a method of transferring at least one pulverulent product, characterized in that it comprises the following steps:

a) providing a device (1) as defined hereinabove;
   b) supplying the initial container (2) with said at least one pulverulent product that is to be transferred;
   c) connecting said device (1) upstream to said initial container (2);
   d) connecting said device (1) downstream to the final container (3) intended to receive said at least one pulverulent product that has been transferred;
   e) transferring said at least one pulverulent product from said initial container (2) to said final container (3).

Figure 8:
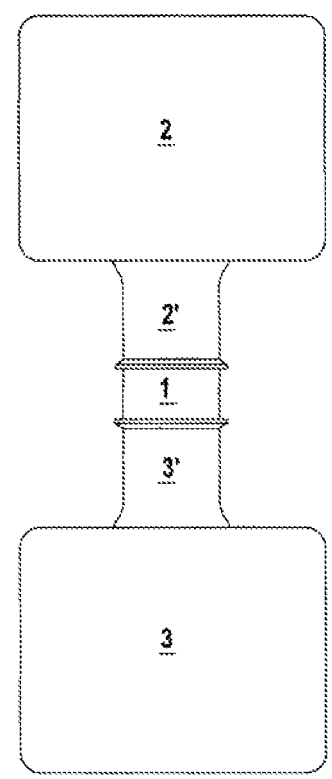
FIG. 8 depicts one preferred embodiment of the installation (100) comprising the device (1) according to the invention, during its operation in the method of transfer according to the invention: said device (1) is then connected to flexible sleeve tubes (2') and (3') respectively fixed to the initial (2) and final (3) containers, without clamps.

According to the invention, for preference, and as depicted in the attached FIG. 8, steps c) and d) are performed by connecting said device (1) to sleeve tubes (2') and (3') fixed respectively to the initial (2) and final (3) containers. According to a first alternative form of embodiment, said intended device (1), comprising said fluid inlet pipes (20) and said fluid discharge pipe (30), has no fluid fed to said pipes (20), (30) during the transfer of said at least one pulverulent product.

According to a second alternative form of embodiment, said method further comprises a step for supplying fluid to said fluid inlet pipes (20) of said device (1) using a stream of fluid under pressure, said at least one discharge pipe (30) remaining closed throughout the operation.

According to the invention, the method of transfer is performed under a stream of pressurized fluid fed to said fluid inlet pipes (20) of said device (1) which stream may be a stream of fluid under low pressure, preferably under a pressure comprised between 10 kPa and 100 kPa, making it possible to create an annulus of said fluid inside said connector (10) while said at least one pulverulent product is being transferred.

According to the invention, said final container intended to receive said at least one pulverulent product that has been transferred may be made of a material that is permeable to the fluid supplied to said pipes (20) oriented substantially in the plane of said connector (10) and impermeable to said at least one pulverulent product transferred, these properties resulting either from the material of said final container (3) or from micropores of suitable diameters.

Further, advantageously, said method may further comprise a step that uses the method of removing dust from said device (1) as defined earlier.

Thus, during the dust removal (FIG. 7), the two sleeve tubes are closed using a system of clamps making it possible to delimit a fluidtight cavity around the device. When powder is being transferred (FIG. 8), the clamps are then removed to leave the powder free to pass.

According to the final subject thereof, the present invention finally covers a method of sterilizing using a device (1) or an installation (100) as defined hereinabove, characterized in that it involves feeding said fluid inlet pipes (20) of said device with a pressurized stream of a fluid so that the entirety of said device (1) or said installation (100) can be sterilized by passing said fluid through said device (1) or said installation (100).

In particular, according to this final subject matter of the invention, said sterilizing fluid may be a flowable vapor, a gas or alternatively may be peracetic acid.

All the subjects of the present invention apply to any pulverulent product that can be used in particular in the context of the manufacture of pharmaceutical, cosmetic or agrifoodstuff products.

FIGS. 1 to 8 form an integral part of the invention and therefore of the description. Thus, the invention covers any feature that appears to be novel over any prior art, in terms of its function and its general character, on the basis of the description considered in its entirety and including the figures which form an integral part thereof. The invention also covers all technical means that are equivalent to those described in terms of their function and/or in terms of their general nature.

The invention claimed is:

1. A device for extracting dust comprising a means of connection between a first container and a second container, said means of connection comprising a hollow connector having an open top end and an open bottom end, comprising a side wall between its two ends, said side wall defining an external wall and an internal wall, wherein said connector is pierced with several fluid inlet pipes connected to hoses fed with a stream of pressurized fluid and said connector being also pierced with at least one fluid discharge pipe, said inlet and discharge pipes projecting from said external wall of said connector, and said inlet pipes opening onto said internal wall via inlet orifices that allow the fluid to be introduced, said inlet orifices being oriented relative to one another in such a way as to cause said fluid to flow in a cyclone within said connector, carrying with it any pulverulent product that remains on at least one part selected from the group consisting of the internal wall, upstream, and downstream of said connector; and said discharge pipe opening onto said internal wall via a discharge orifice located intermediate between said open top end and said open bottom end, thereby allowing the fluid carrying any pulverulent product to be discharged from the connector.

2. The device as claimed in claim 1, wherein some of said inlet pipes open onto the internal wall of said connector at an orientation that is tangential to said wall and are oriented, independently or in combination:

upward at an angle $\theta_1$ comprised strictly between 0° and 90° with respect to the plane of the open top end of said connector, the limit values $\theta_1=0°$ and $\theta_1=90°$ being excluded; or downward at an angle $\theta_1$ strictly comprised between 0° and 90° with respect to the plane of the open top end of said connector, the limit values $\theta_1=0°$ and $\theta_1=90°$ being excluded.

3. The device as claimed in claim 2, wherein some of said tangentially oriented fluid inlet pipes are, independently or in combination, oriented:

upward at an angle $\theta_1$ comprised between 20° and 60° with respect to the plane of the open top end of said connector; or downward at an angle $\theta_1$ comprised between 20° and 60° with respect to the plane of the open top end of said connector.

4. The device as claimed in claim 2, wherein some of said tangentially oriented fluid inlet pipes are, independently or in combination, oriented:

upward at an angle $\theta_2$ comprised between 0° and 90° on each side of the plane of section defined by an axis of revolution of said connector and the axis parallel to said axis of revolution and passing through the edge of the orifice of the pipe in question; or downward at an angle $\theta_2$ comprised between 0° and 90° on each side of the plane of section defined by the axis of revolution of said connector and the axis parallel to said axis of revolution and passing through an edge of the orifice of the pipe in question.

5. The device as claimed in claim 1, wherein said at least one fluid discharge pipe is oriented substantially in or parallel to the plane formed by said open top end of the connector.

6. The device as claimed in claim 1, wherein said connector has a substantially cylindrical internal wall.

7. The device as claimed in claim 1, wherein said connector is made of a plastic, giving it a disposable nature.

8. The device as claimed in claim 1, wherein said connector consists of a sleeve to which said fluid inlet and discharge pipes are grafted.

9. An installation comprising the device as claimed in claim 1, a first container upstream, a second container downstream, and a pump or compressor, wherein said fluid inlet pipes are fed by means of said pump or of said compressor and in that said at least one fluid discharge pipe is connected to a hose connected to a suction system or left open to an external environment or, connected to said second container.

10. The installation as claimed in claim 9, which further comprises, downstream of said pump or of said compressor, a system of two turbines connected by a shaft, the first turbine being driven by a fluid stream that feeds said fluid inlet pipes, and the second turbine making it possible to create a vacuum to discharge said fluid via said at least one fluid discharge pipe.

11. A method for extracting dust in the context of the transfer of pulverulent products from a first container to a second container, which is carried out in the device as claimed in claim 1 and which comprises the following steps:

a) providing a device as defined in claim 1;

b) connecting said device upstream and downstream to the initial and final containers for said pulverulent product;

c) feeding said fluid inlet pipes with a stream of pressurized fluid in order to cause said fluid to flow in a cyclone within said connector, carrying with it any pulverulent product that remains on at least one element selected from the group consisting of the internal wall upstream and downstream of said connector; and d) discharging said fluid and said pulverulent product via said at least one fluid discharge pipe.

12. The method as claimed in claim 11, wherein step b) is performed by connecting said device to sleeve tubes fixed respectively to the initial and final containers, and by closing the opening of said containers using external clamping means.

13. The method as claimed in claim 11, wherein said discharging step furthermore comprises a suction step of said discharged fluid, by means of a suction system connected to said at least one fluid discharge pipe by a hose.

14. A method of transferring at least one pulverulent product from a first container to a second container, which is carried out in the device as claimed in claim 1, which comprises the following steps:
   a) providing a device as defined in claim 1;
   b) supplying the first container with said at least one pulverulent product that is to be transferred;
   c) connecting said device upstream to said first container;
   d) connecting said device downstream to said second container intended to receive said at least one pulverulent product that has been transferred; and
   e) transferring said at least one pulverulent product from said first container to said second container.

15. The method as claimed in claim 14, wherein no fluid is fed to said pipes during the transfer of said at least one pulverulent product.

16. The method as claimed in claim 14, which further comprises a step of feeding fluid to said fluid inlet pipes of said device, with a stream of pressurized fluid, said at least one discharge pipe remaining closed.

17. The method as claimed in claim 16, wherein said stream of pressurized fluid fed to said fluid inlet pipes of said device is a stream of fluid under low pressure, making it possible to create an annulus of said fluid within said connector while said at least one pulverulent product is being transferred.

18. The method as claimed in claim 14, wherein steps c) and d) are performed by connecting said device to sleeve tubes fixed respectively to said first and second containers.

19. A method of sterilizing using a device as claimed in claim 1 which involves feeding said fluid inlet pipes of said device with a pressurized stream of a fluid so that the entirety of said device or said installation can be sterilized by passing said fluid through said device or said installation.

20. The method as claimed in claim 19, wherein said sterilizing fluid is a flowable vapor, a gas or peracetic acid.

21. The device as claimed in claim 1, wherein said connector further comprises a closure system in its top or bottom end(s) or both, allowing the fluid tight connection between two containers.

22. The device as claimed in claim 1, wherein said fluid inlet pipes are arranged around said connector antisymmetrically with respect to the axis of revolution of said connector, thereby obtaining optimum cyclonic flow dynamics.

23. The device as claimed in claim 1, wherein the hollow connector is connected to a flexible and crushable first hollow sleeve tube forming the connection between the first container and the open top end of said connector, and to a flexible and crushable second hollow sleeve tube forming the connection between the second container and the open bottom end of said connector, so as to allow closed containment of a small volume by crushing the first sleeve tube and the second sleeve tube during cleaning operations.

24. A method for extracting dust in the context of the transfer of pulverulent products from a first container to a second container, which is carried out in an installation as claimed in claim 9, and which comprises the following steps:
   a) providing an installation as defined in claim 9;
   b) connecting said installation upstream and downstream to the initial and final containers for said pulverulent product;
   c) feeding said fluid inlet pipes with a stream of pressurized fluid in order to cause said fluid to flow in a cyclone within said connector, carrying with it any pulverulent product that remains on at least one element selected from the group consisting of the internal wall upstream and downstream of said connector; and
   d) discharging said fluid and said pulverulent product via at least one fluid discharge pipe.

25. A method of transferring at least one pulverulent product from a first container to a second container, which is carried out in the installation as claimed in claim 9, and which comprises the following steps:
   a) providing an installation as defined in claim 9;
   b) supplying the first container with said at least one pulverulent product that is to be transferred;
   c) connecting said installation upstream to said first container;
   d) connecting said installation downstream to said second container intended to receive said at least one pulverulent product that has been transferred; and
   e) transferring said at least one pulverulent product from said first container to said second container.

26. A method of sterilizing using an installation as claimed in claim 9, which involves feeing said fluid inlet pipes of said installation with a pressurized stream of a fluid so that the entirety of said installation can be sterilized by passing said fluid through said installation.

27. The device as claimed in claim 1, wherein said discharge pipe is directed substantially in or parallel to the plane formed by the open top end of said connector and situated at a point substantially mid-height of said connector.

* * * * *